United States Patent [19]

Parrish

[11] 4,238,919
[45] Dec. 16, 1980

[54] AUTOMATIC BALE EJECTION DRIVE OVERRIDE MEANS

[75] Inventor: Charles A. Parrish, New Holland, Pa.

[73] Assignee: Sperry Corporation, New Holland, Pa.

[21] Appl. No.: 25,171

[22] Filed: Mar. 29, 1979

[51] Int. Cl.³ ............................................. A01F 15/00
[52] U.S. Cl. ........................................ 56/341; 100/88
[58] Field of Search ................. 56/341, 344; 100/88, 100/89; 414/502, 509

[56] References Cited

U.S. PATENT DOCUMENTS

| | | | |
|---|---|---|---|
| 3,189,202 | 6/1965 | Hanson | 414/502 |
| 3,722,197 | 3/1973 | Vermeer | 56/341 |
| 3,754,388 | 8/1973 | Neely, Jr. | 56/344 |
| 3,804,134 | 10/1974 | Luscombe | 414/502 |
| 3,848,526 | 11/1974 | Mast | 56/341 |
| 3,859,909 | 1/1975 | Mast | 56/341 |
| 4,143,505 | 3/1979 | Sheesley et al. | 56/341 |

Primary Examiner—Paul J. Hirsch
Attorney, Agent, or Firm—R. D'Alessandro; Frank A. Seemar

[57] ABSTRACT

In a crop roll forming machine having a reversibly rotatable upper bale forming means, lower bale forming means and a drive means there is provided a control means affixed to the frame movable between at least a first position and a second position for cooperative interaction with the drive means and the upper and lower bale forming means to selectively cause the lower bale forming means to be driven in a generally rearward direction when the control means is moved from the first position to the second position so that a partially formed crop roll is ejected rearwardly from the machine onto the ground.

14 Claims, 3 Drawing Figures

AUTOMATIC BALE EJECTION DRIVE OVERRIDE MEANS

BACKGROUND OF THE INVENTION

This invention relates to a machine for forming large cylindrical bales of crop material, commonly called round bales, in a roll forming region above the ground. More specifically, it is concerned with apparatus which permits the completed bale to be discharged from the roll forming region onto the ground by the automatic reversing of the bale forming means or upper apron.

Historically, it has been the custom to harvest forage crops by mowing the particular crop, letting it dry in the field, forming the dried crop material into windrows and passing a hay-baling machine over and along these windrows to form the crop material into rectangular bales. Recent practice has shown that the formation of crop material into large compact rolls, rather than rectangular bales as formerly done, permits the crop material to be deposited in roll form and left in fields for extended periods of time. The ability to leave these rolled bales in fields obviates the additional steps required in the traditional rectangular baling process of gathering the bales and transporting them to a storage area protected from the elements. This new technique of forming large round bales has created a baling systen that can be conducted by one person. This is in marked contrast to the traditional practice of forming rectangular bales where the labor of several people was required to effect the cutting, drying, windrowing, baling, gathering and storing of the crop material.

Several methods of forming compact cylindrical rolls of crop material have evolved through the years. The most successful of these methods involves the forming of crop rolls by picking up a swath or window of material from the field and directing it onto a lower conveyor. This conveyor transports the material to a roll or bale forming region where an upper apron or flight of belts, usually positioned above and adjacent the conveyor, moves in a suitable direction to rotate the crop material with which it is brought into contact. The increasing popularity of these crop roll forming machines has seen their use broaden from rolling wintering forage for livestock to rolling high protein crops, such as alfalfa, for dairy livestock. Therefore, these machines are the focal point of many ideas for developing both labor-saving and time-saving apparatus.

Crop roll forming machines that produce large cylindrical crop rolls utilize some form of a tailgate which is pivotally mounted to the frame of the machine. The tailgate is elevated upon completion of the crop roll or when it is desired to discharge a less than full size bale for any of a variety of reasons from the roll forming region. The tailgate follows a predetermined arc of travel, generally pivoting about a fixed point on the frame.

Prior crop roll forming machines require the operator, who is located in the operator's area of a prime moving vehicle, such as a tractor, to perform a series of manual operations after completing the formation of the large crop roll and prior to recommencing the roll forming process or cycle. Generally these manual steps require the stopping of the roll forming machine and the towing tractor, the initiation of the wrapping of the completed crop roll, stopping the power takeoff shaft from the tractor, opening the tailgate, restarting the power takeoff shaft to power the roll forming machine's components to assist in discharging the bale, closing the tailgate and finally, restarting the forward motion of the tractor and the roll forming machine. Recently developed crop roll forming machines have reduced the number of manual steps which the machine operator must perform after the completion of the formation of each bale.

These recently developed crop roll forming machines generally discharge the completed crop material package from the roll forming region by pivoting the tailgate rearwardly and upwardly, thereby permitting the upper bale forming means to automatically cease rotation in a first direction and commence rotation in an opposing second direction. This automatic reversal of the upper bale forming means simultaneously occurs with the declutching of the lower bale forming means or conveyor. A completed crop roll thus is urged rearwardly out of the machine onto the ground with the operator being required only to stop the towing tractor, initiate the wrapping of the roll and opening and then closing the tailgate. Under certain conditions, such as when the supply of crop material to be baled has been exhausted or when the core of the roll has broken down, it is necessary to eject a partially formed roll of relatively small diameter. Usually the mere reversing of the upper bale forming means will not effect the ejection of the crop roll under these conditions since the partially formed bale or core of crop material presents too little surface area for engagement with the upper bale forming means and occupies too little of the bale forming region. Any rolling motion imparted to the core or partially formed bale will be insufficient to propel the bale out of the bale forming region and onto the ground. It then becomes necessary to impart a more positive ejection force to the core.

The foregoing problems are solved in the design of the machine comprising the present machine by providing drive means for discharging the completed crop roll automatically with the raising motion of the tailgate. The drive means is provided with a selectively actuatable control means to permit the roll forming machine operator to override the automatic reversing of the upper bale forming means and prevent the declutching of the lower bale forming means, thereby causing the lower bale forming means to continue to move rearwardly to convey a partially formed crop roll rearwardly out of the bale forming region and onto the ground at the rear of the machine.

SUMMARY OF THE INVENTION

It is an object of the present invention to provide in a crop roll forming machine apparatus that will permit the machine operator to discharge the core of an incompletely formed crop roll from the bale forming region.

It is a feature of the present invention to provide a drive system for a roll forming machine which will permit the operator to override the clutch which automatically disengages the lower bale forming means to permit the lower bale forming means to be engaged so that it is driven rearwardly to eject an incompletely formed crop roll.

It is a further feature of this invention that there is imparted to the incompletely formed crop roll sufficient force to eject it from the bale forming region.

It is an advantage of the present invention that the clutch which automatically disengages the lower bale forming means cannot be overriden beyond a predetermined point in the elevation of the tailgate to preclude damage from occurring to the bale forming machine's drive system.

These and other objects and advantages are obtained by providing in a crop roll forming machine adapted to be towed across a field control means affixed to the frame movable between at least a first position and a second position for cooperative interaction with the drive means and the upper and lower bale forming means to selectively cause the lower bale forming means to be driven in a generally rearward direction when the control means is moved from the first position to the second position so that in conjunction with the upper bale forming means a partially formed crop roll is ejected rearwardly from the roll forming machine onto the ground.

BRIEF DESCRIPTION OF THE DRAWINGS

The advantages of this invention will become apparent upon consideration of the following detailed disclosure of the invention, especially when it is taken in conjunction with the drawings wherein.

DETAILED DESCRIPTION OF THE PREFERRED EMBODIMENT

Figure 1:
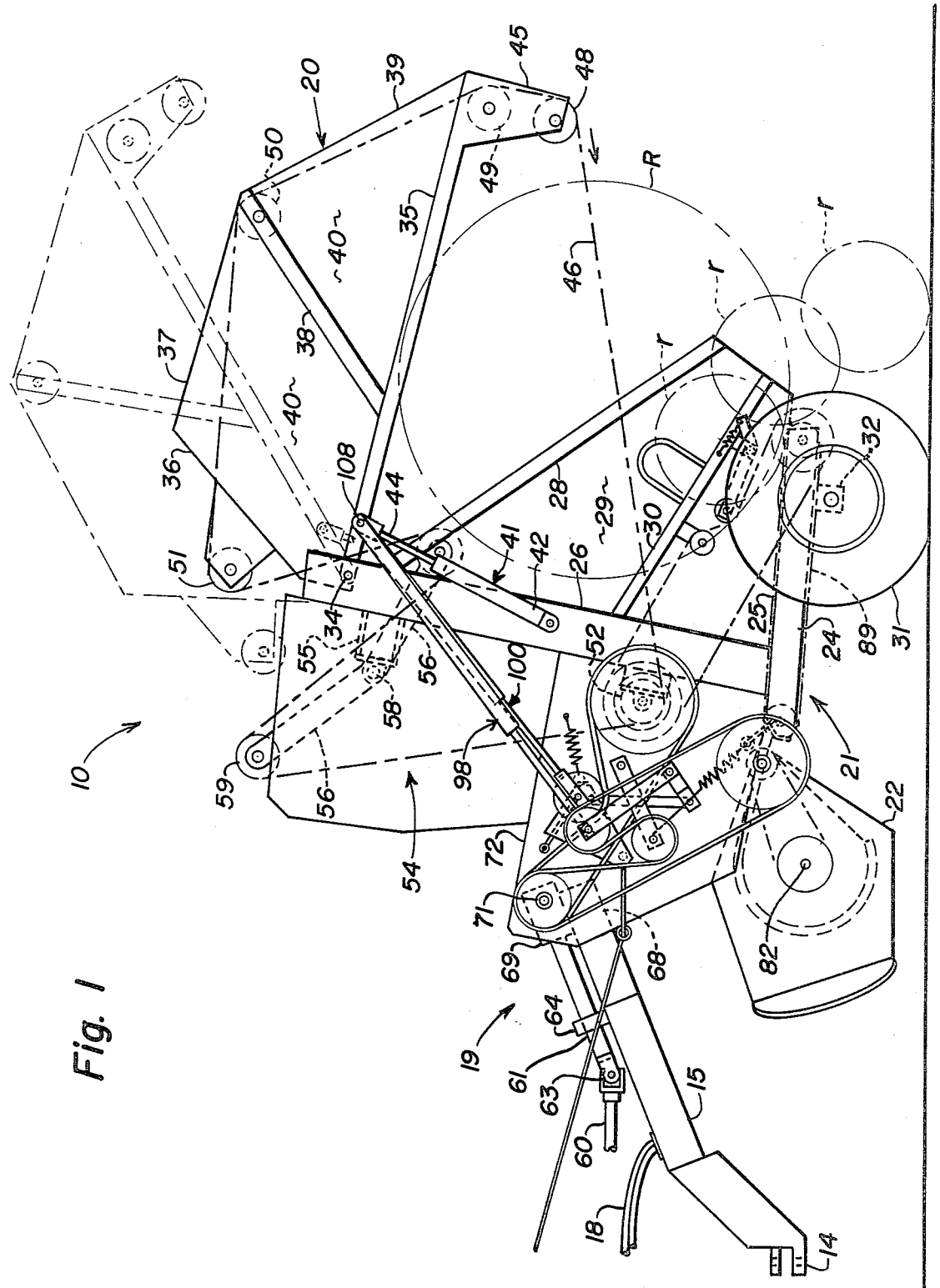
FIG. 1 is a side elevational view of a crop roll forming machine adapted to be towed by a tractor having the side shielding broken away to show the drive means for the upper apron and showing in solid lines the tailgate's positioning for ejecting a core or partially formed bale and in phantom lines the fully raised position for ejecting a fully formed bale.

Referring generally to the drawings and in particular to FIG. 1, there is shown a general representation of the crop roll forming machine 10 of the type illustrated in U.S. Pat. No. 3,859,909 to Mast, dated Jan. 14, 1975. The crop roll forming machine 10 is illustrated in position to be fastened to a towing vehicle such as a tractor which has a power takeoff shaft (not shown) providing the rotary driving force for the mechanically operated components of the crop roll forming machine. The machine 10 is appropriately fastened via the towing hitch 14 mounted on the draft member 15 of the roll forming machine 10 to the hitch member of the tractor (not shown). The tractor hydraulic lines 18 provide the necessary fluid from the tractor's hydraulic reservoir (not shown) for the hydraulically operated components of the roll forming machine 10. The drive means for the roll forming machine 10 is indicated generally by the numeral 19.

The roll forming machine 10, shown in FIG. 1, comprises generally an upper frame 20 and a lower frame 21. Lower frame 21 has mounted to its forward portion a pickup 22, normally tined, for collecting crop material deposited in preformed windrows on a field and delivering it to the roll forming machine 10. The lower frame 21 includes a horizontal beam member 24 to which is suitably fastened a floor 25. The floor 25 alternatively may be in the form of sheet metal with appropriate channels (not shown) having conveying chains running therealong, as illustrated in the aforementioned patent to Mast, or may consist of one or more conveyor belts rotatably mounted or any other means suitable for supporting crop material once it is delivered thereto by the pickup 22. Horizontal beam member 24 is connected at its forward end to a generally vertical beam member 26. A diagonal brace member 28 is appropriately fastened to the top of vertical beam member 26 and extends downwardly and rearwardly until it joins fixedly with a bracing member at the rearward portion of the side sheet covering member 29. A diagonal bracing member 30 extends upwardly and forwardly from the rear of side sheet covering member 29 until it is fixedly fastened to vertical member 26. This lower frame 21 is mobilely mounted to a pair of wheels 31 (only one of which is shown) via a suitable axle and support beam indicated generally by the numeral 32.

Upper frame 20, shown in solid lines in a partially elevated position in FIG. 1, consists of a tailgate pivotable about its mounting point 34 at the top of vertical member 26. The tailgate or upper frame 20 is formed from a series of interconnected bracing members 35,36,37,38 and 39 and is encased by side sheet members 40 and rear sheet members (not shown). The upper frame 20 is raised and lowered by means of a pair of hydraulic cylinders 41, only one of which is shown. As best seen in FIG. 1, the hydraulic cylinders 41 are mounted one on each side of the frame with the barrel end 42 being fastened to the vertical beam member 26 of the lower frame 21 and the rod end 44 being fastened to the bracing member 35 of the upper frame 20. Suitable hydraulic lines (not shown) are connected to opposite ends of the cylinders 41 to supply the fluid from the aforementioned tractor hydraulic reservoir for the selective activation of the hydraulic cylinders. As best seen in the elevated position of FIG. 1, the upper frame has an elongated section 45 of the type shown and described in U.S. Pat. No. 4,143,505 assigned to the assignee of the present invention.

The upper bale forming means or upper apron 46 travels about the periphery of the roll forming machine 10 on a series of appropriately mounted idler sprockets 48,49,50,51 and a drive sprocket (not shown) mounted about a reversible rotatable shaft 52. Shaft 52 is suitably rotatably affixed or mounted to vertical frame member 26. A takeup mechanism indicated generally by the numeral 54 in FIG. 1 is fastened to bearing brackets 55 which are in turn secured to the upper portion of vertical member 26. The takeup mechanism 54 further includes a pair of pivotable parallel arms 56, one being positioned on each side of the frame. The takeup mechanism pivots about a bearing 58 and thereby allows the upper apron 46 to be played out and about the periphery of expanding crop roll R. The upper apron 46 passes about sprockets 59 mounted on the end of each of the takeup arms 56. The upper apron 46 is preferably comprised of a pair of roller link chains (not shown) transversely spaced apart on opposing sides of the machine 10. These chains are interconnected by a series of spaced apart parallel crop engaging members which combine with the roller link chains to form a rotatable curvilinear crop engaging member.

The details of the roll forming machine are not described in further detail at this point because they are old and well known to one of ordinary skill in the art. It should be noted, however for the purpose of the invention to be described hereinafter, that the upper apron 46 could equally well comprise the aforementioned roller link chains, as well as a series of expandable belts or a series of rollers of cylindrical or hexagonal cross section arranged to form a movable curvilinear surface.

Drive means 19 is connected to the power takeoff shaft of the towing tractor through a series of connecting shafts and gearboxes. Connecting shaft 60 of FIG. 1 connects to the power takeoff shaft of the tractor above draft member 15. Shaft 60 then joins input shaft 61 via a universal joint 63. Input shaft 61 is rotatable fastened to draft member 15 via support bracket 64. Rearwardly of bracket 64 draft member 15 separates into two members, only one of which is shown as 65 in FIG. 2, to generally form an A-frame type of structure. These two members are fixedly fastened to a horizontal support member 68, briefly shown best in FIG. 2, which extends tranversely across the width of the roll forming machine 10. Input shaft 61 then is joined with a right angle gearbox 69 suitably fastened atop horizontal support member 68. The rotary power is transferred within gearbox 69 through a set of bevel gears (not shown) to an output shaft 71. As evident from FIGS. 2 and 3, shaft 71 extends through side member 72 and at its extremity has mounted thereabout a multi-grooved drive sheave 74. The sheave 74 and output shaft 71 are continuously driven during the operation of the roll forming machine 10 without disengaging the power takeoff shaft of the tractor. As best shown in FIG. 3, the rotary power being transferred from the tractor power takeoff shaft through the gearbox 69 to the sheave 74 is transferred via drive belt 75 to sheave 76 and then to shaft 78 about which sheave 76 is mounted.

Figure 2:
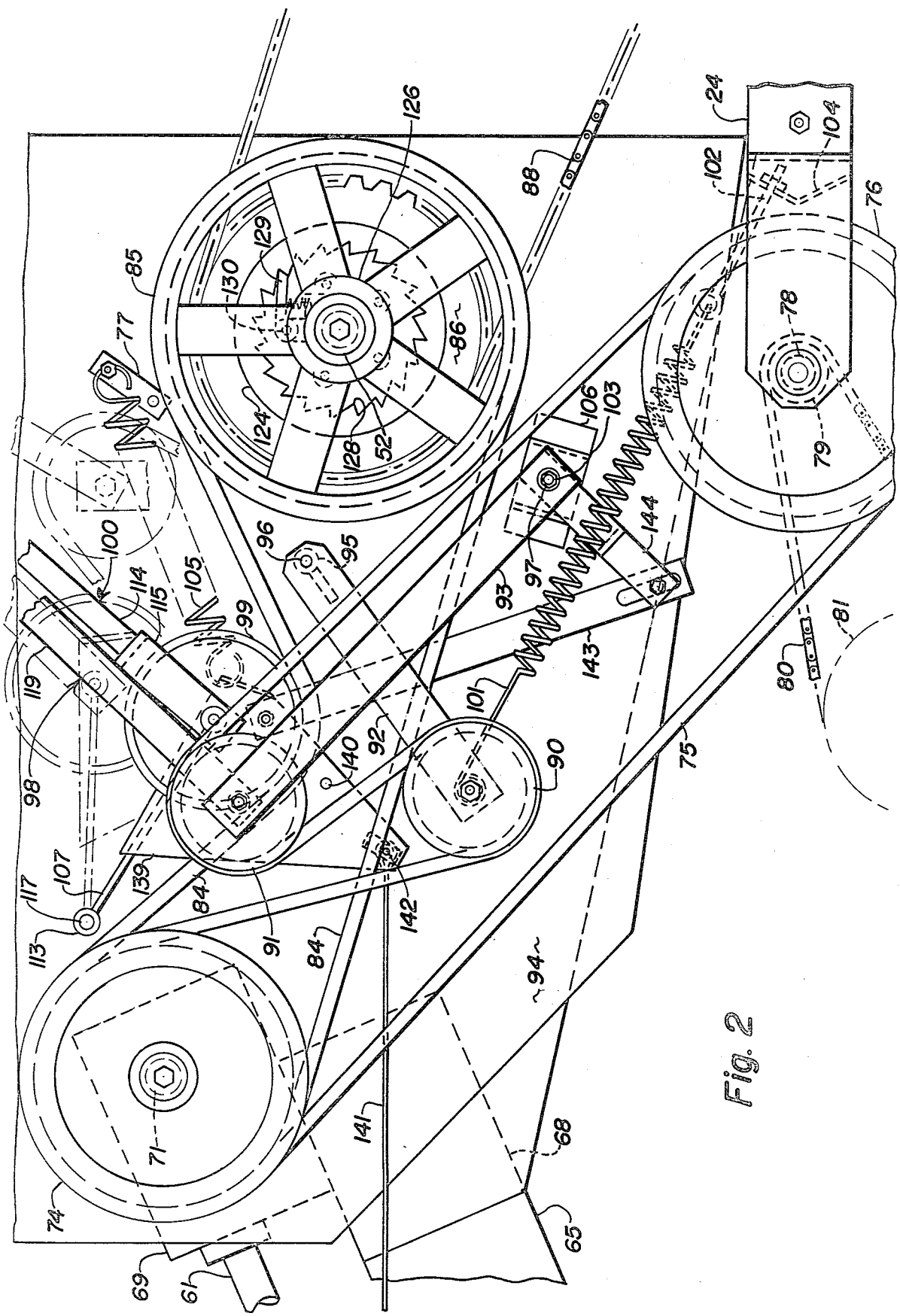
FIG. 2 is an enlarged side elevational view of the drive means for the upper bale forming means of the crop roll forming machine illustrating the control means used to override the automatic declutching of the lower bale forming means or conveyor. The positioning of the tensioning idlers when the tailgate is in the closed position is shown in solid lines and in phantom lines when the tailgate is in the fully raised position.
Figure 3:
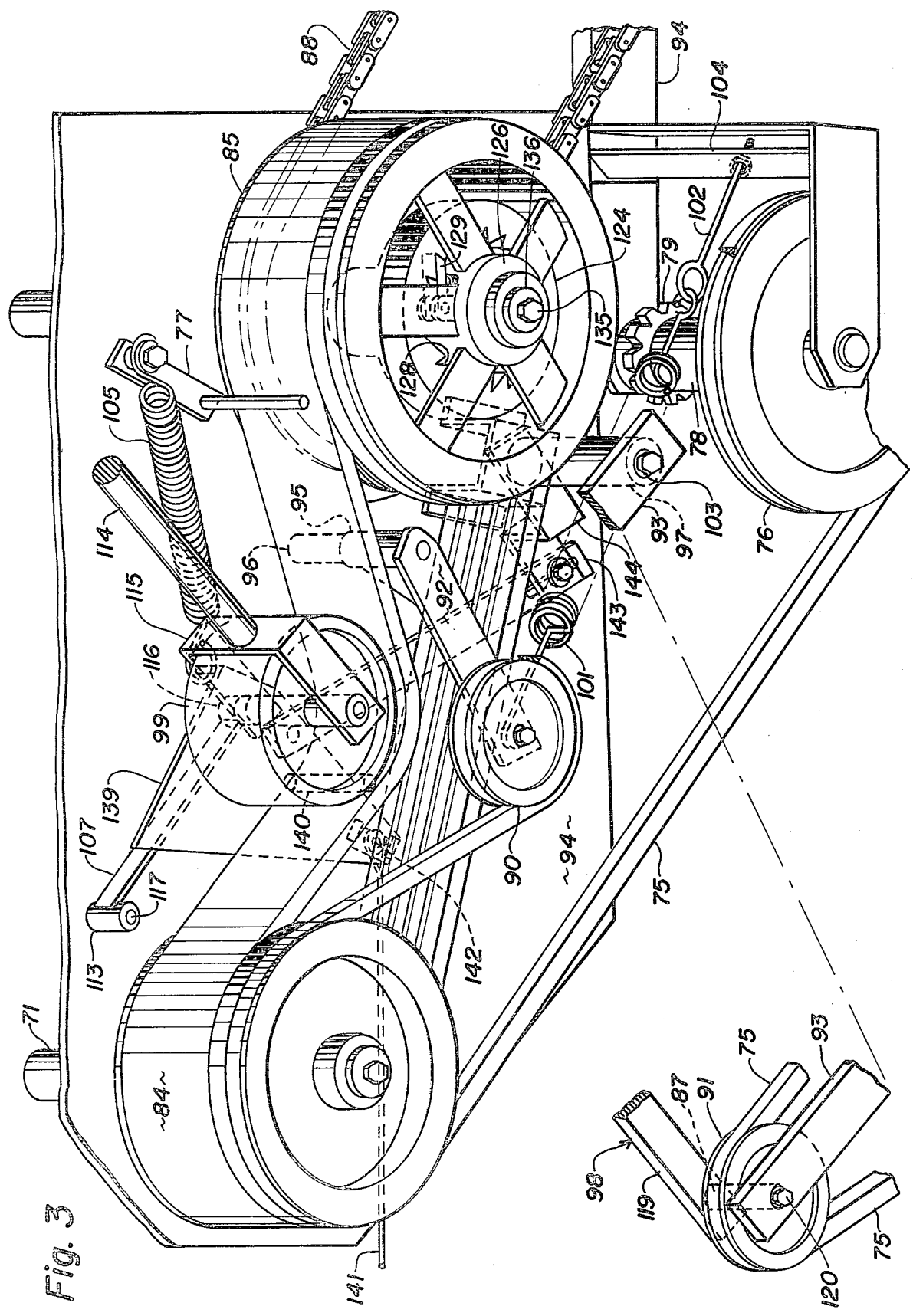
FIG. 3 is a side perspective view of the drive means and the control means used to override the automatic disengaging of the lower bale forming means or conveyor when the upper bale forming means is reversed to eject a bale or core.

The transfer of rotary power is best seen in FIG. 2 where in enlarged scale the drive means 19 is first shown in solid lines with the components in position to drive the upper apron 46 in a first direction utilized during the formation of a bale; and secondly, in phantom in position to drive the upper apron 46 in an opposing second direction utilized during the discharge of the bale, respectively. Interiorly of the sheave 76 shaft 78 has a sprocket 79 mounted thereabout which is connected via chain 80 to driven pickup sprocket 81 which is mounted about pickup drive shaft 82. Shaft 82 than drives the tined pickup 22 which is pivotally mounted to the lower frame 21 of FIG. 1.

Drive sheave 74 also has a second driving belt 84 mounted thereabout interiorly of the drive belt 75. Belt 84 is wrapped about multiply grooved driving sheave 85 which is mounted about reversibly driven shaft 52 which, in turn, drives the upper apron 46. Bracket 77 has a belt guide pin extending outwardly over sheave 85 which aids in keeping belt 84 properly seated about its sheaves. Interiorly of multiply grooved sheave 85 and coaxially mounted about shaft 52 is a sprocket 86 about which is wrapped a chain 88. Chain 88 drives the lower bale forming means or apron 89, illustrated in phantom in FIG. 1.

As shown in FIGS. 2 and 3, drive belt 75 and driving belt 84 are maintained with the proper amount of tension to transmit rotary power from output shaft 71 via drive sheave 74 to both sheave 76 and multiply grooved sheave 85 by means of a series of movable tensioning idlers. The relationships of these idlers to belts 75 and 84 during the roll forming cycle and the roll ejection cycle also are shown in FIG. 2, the former positioning being shown in solid lines and the latter positioning in phantom lines, respectively.

Drive belt 75 is tensioned by a pair of rotatable idlers 90 and 91 which are movable separately with respect to each other. Idler 90 is rotatably mounted to arm 92 which is pivotally affixed to side sheet member 94 via bushing 95 and pin 96. Idler 90 is spring biased via spring 101 which is fastened via a suitable clevis 102 mounted to bracket 104. Bracket 104 is fixedly fastened to horizontal beam member 24. Spring 101 serves to keep belt 75 under the proper amount of tension to transmit rotary drive power when the upper frame or tailgate 20 is in the closed position and a crop roll R is being formed within the machine in a region commonly known as the roller bale forming region. Idler 91 is fastened to an extensible support arm attached at the upper end to the tailgate 20 and which is indicated generally by the numeral 98. A connecting link 93 is pivotally affixed to bracket 106 suitably fastened to side sheet member 94. Connecting link 93 is mounted to bracket 106 by bushing 97 and pin 103. On its opposing end link 93 rotatably supports idler 91 by bushing 87 and pin 120, best shown in the broken away view of idler 91 in FIG. 3. Link 93 and support arm 98 are joined via bushing 87 and pin 120 for coordinated movement as the tailgate 20 is raised to control the positioning of idler 91.

Driving belt 84 is tensioned by movable idler 99 which is rotatably affixed to a second extensible support arm also attached at its upper end to the tailgate 20 and indicated generally by the numeral 100. As best seen in FIG. 3, pivot arm 107 is suitably journalled on one end to roller pin 116 at the base of support arm 100. On its opposing end pivot arm 107 is journalled in side sheet member 94 by bushing 113 and pin 117, thus permitting it to pivot upwardly with idler 99 as support arm 100 is lifted by the raising of the tailgate 20.

A control plate 139 is fixedly fastened to pivot arm 107 so that it follows the pivotal movement of arm 107 and idler 99 when the tailgate 20 is opened. Projecting outwardly from plate 139 generally intermediately of its length is a lifting pin 140. Pin 140 slides beneath the upper run of belt 84 when the idler 99 is raised by the lifting of the tailgate to insure that the tension applied to the belt 84 is sufficiently reduced to stop the transfer of rotary power between drive sheave 74 and multiply grooved sheave 85. A pull line or rope 141 is suitably fastened to the bottom portion of control plate 139 at location 142. Pull line 141 runs forwardly from the front of roll forming machine 10 to the operator's area of the tractor (not shown). Control plate 139 has connecting arm 143 connected generally intermediately thereto between roller pin 116 and lifting pin 140. Connecting arm 143 is slidably and movably joined at its opposing end to angle arm 144. The angle arm 144 is fixedly fastened to link 93 and therefore always maintains the angular relationship therewith shown in FIG. 2. The slot shown in the bottom portion of connecting arm 143, in conjunction with the designed limitation in pivotal motion of link 93 upwardly and rearwardly when the tailgate is raised, limits the amount of rotation upwardly which pivot arm 107 can achieve during operation. Angle arm 144 has at its uppermost end a suitably sized aperture to rotatably fit about bushing 97 and pin 103. The inward angling of angle arm 144 permits connecting arm 143 to be movably journalled so that it extends upwardly interiorly of movable idler 99. Connecting arm 143 is fastened on the interior side of control plate 139. Spring 105, suitably anchored on one end to control plate 139 and on its opposite end to bracket 77, serves to relieve the tension on belt 84 by lifting control plate 139 and idler 99 as the tailgate 20 is elevated beyond a predetermined point in its arcuate path to the raised or open position.

Extensible support arms 98 and 100, as shown in FIG. 1, are suitably fastened at their upper ends to bracing member 35 of the upper frame or tailgate 20 by a stub pin 108 and bushing (not shown). Support arm 100 has an upper base member with a spring (both not shown) inserted within its hollow upper portion. The opposing end of arm 100 has inserted therein a telescoping portion 114 which has at its lower end a bracket 115 suitably fastened thereto, best shown in FIGS. 2 and 3. Idler 99 is rotatably mounted about roller pin and bushing 116 which passes through the legs of bracket 115. A spring within the upper base member (both not shown) of support arm 100 serves to keep sufficient tension via idler 99 on belt 84 to permit the transfer of rotary drive power when the tailgate 20 is in the closed position. Support arm 98 similarly is mounted about pin 108 and its associated bushing at the upper portion of its base member (not shown in detail). Inserted within the hollowed lower end of the base member of support arm 98 is the telescoping portion, best shown in the cut away view of FIG. 3. The lower portion of telescoping member 119 has a roller pin 120 fixed thereto and about which the idler 91 is rotatably mounted. The most exterior or outboard end of roller pin 120 has connecting link 93 affixed thereto. The telescoping portions 119 and 114 of support arms 98 and 100, respectively, are movably within their respective base members to permit some lost motion to occur in the movement of the idlers 91 and 99 as the tailgate is raised. This permits the required amount of tension to be maintained on the belts 75 and 84 until certain predetermined points in the elevational path of the tailgate are reached.

The arcuate movement of the tailgate, in conjunction with spring 105, causes the idler 99 to be sufficiently raised to reduce the required tension to interrupt the transfer of the rotary drive power transmitted via belt 84. Belt 75 is continuously maintained under tension as the tailgate 20 is raised by the cooperative pivotal effect of idlers 90 and 91 and spring 101 so that rotary driving force is continuously transferred from sheave 74 to sheave 76. As the tailgate continues to be raised towards its fully extended position, a second predetermined point is reached where the arm 98 is in a position which causes the idler 91 to pull the drive belt 75 sufficiently upwardly and rearwardly that it back wraps about multiply grooved sheave 85. The combined cooperative effect of idlers 90,91, spring 101 and arm 98 creates greater tension on the back wrapped drive belt 75 when the tailgate is in the raised position than when it is in the lowered or closed position. The effect of this back wrapping will be further explained hereinafter.

A support shelf (not shown) may be suitably affixed to side sheet member 94 to support the lower run of driving belt 84 when the tailgate is raised beyond the predetermined point that removes the tension from driving belt 84 to interrupt the transfer of rotary power between the drive sheave 74 and multiply grooved sheave 85.

Shaft 52 has a one-way clutch 124 mounted about it inwardly of multiply grooved sheave 85. Clutch 124 is best shown in FIGS. 2 and 3. The interior of hub 126 has a pawl or dog 129 fastened to it by pin 130. The pawl is spring biased by a compression spring inserted in a suitable slot cast in the hub. The clutch 124 seats within the sheave 85 and has ratcheting 128 circumferentially cast about the entire interior circumference. The ratcheting 128 cooperates with pawl 129 so that when the sheave 85 is rotated in a counterclockwise direction, the clutch is disengaged and the pawl 129 rides over the ratcheting 128. When the sheave 85 turns and rotates in a clockwise direction, the pawl 129 engages ratcheting 128 and causes the sprocket (not shown) about which the chain 88 of the lower bale forming means or lower apron passes to correspondingly rotate. This sprocket is bolted or pinned to the clutch 124. The rotation of the lower apron sprocket causes lower apron chain 88 to be driven and accordingly drives the lower apron 89, briefly shown in FIG. 1. The end of shaft 52 preferably is splined and interfits with the splined center of sheave 85. The sheave 85 is securely fastened to the exterior of shaft 52 in FIG. 3 by a locking bolt 135 and washer 136, or in another suitable fashion.

Alternately, the interior of hub 126 could be composed of ratcheting 128 circumferentially cast about the entire interior circumference of the sheave 85. The ratcheting 128 would then cooperate with the pawl or dog 129 fastened to the clutch by a pin 130. In this configuration when the sheave 85 is rotated in a clockwise direction, the clutch would be disengaged and the pawl 129 would ride over the ratchets 128. A driving relationship would exist between the ratcheting 128 and the pawl 129 when the sheave 85 turns in a counterclockwise direction.

In operation the roll forming machine 10 is towed across a field that has arranged thereon in preformed windrows a suitable crop material that has been previously cut. The tined pickup 22 gathers the windrowed crop material, picks it up from the ground and transports it upwardly into the forward portion of the floor 25. The crop material is then transported by the lower apron 89 rearwardly into contact with the moving upper apron 46. The upper apron 46 causes the crop material to be rolled at the rear of the floor 25 in what is commonly called the bale forming region and initiates the formation of a core of crop material. The crop material is continually fed into the bale forming region where it is formed into a progressively increasing sized core. The upper bale forming means 46 expands about the crop roll R as the roll increases in size by means of the rotation of the takeup means 54 which permits the playing out of more of the upper bale forming means to accommdate the increased bale size. Once the crop roll R has reached the desired size, the operator stops the machine 10 and, if desired, wraps the roll R with a wrapping or binding material. Upon completion of the roll forming and wrapping cycles, the operator elevates the upper frame or tailgate 20 in preparation for discharging the completed crop roll R onto the ground.

Initially while the upper frame 20 is being raised the support arms 98 and 100 maintain sufficient pressure on the idlers 91 and 99 to cause belts 75 and 84 to continue to transfer rotary force. However, beyond a first predetermined point in the elevation of the upper frame 20 the lost motion built into the telescoping portion 119 of the support arm 98 has reached its limit and the idler 91 begins to be raised sufficiently to affect the manner in which the transfer of rotary power through the belt 75 is achieved. Similarly, at a second predetermined point in the elevation of upper frame 20 the tension spring within the support arm 100 reaches its limit of expansion and idler 99 begins to be raised, thereby decreasing the tension on driving belt 84 until it causes the sheave 85 to cease to be driven. This in turn stops the rotation of shaft 52 which is connected to the sprocket which drives the upper bale forming means 46. As the tailgate or upper frame 20 continues to be raised idler 91 on the lower end of support arm 98 is pivoted upwardly and rearwardly about the pivot point of connecting ling 93. This pivotal motion of idler 91 in turn causes idler 90 to be pivoted upwardly in a generally clockwise rotation about the pivot pin 96 of idler arm 92. During this entire time rotary drive continues to be transmitted via drive belt 75 from the drive sheave 74 to sheave 76. At the first predetermined point in the elevation of the tailgate or upper frame 20 the idler 91 is pulled sufficiently upwardly and rearwardly to cause the belt 75 to begin to back wrap about the now stationary sheave 85. Once the belt 75 is back wrapped about sheave 85 with sufficient tension, the continued movement of belt 75 imparts a counterclockwise motion to sheave 85, thereby causing the one-way clutch 124 to disengage as pawl 129 passes over the ratcheting 128. Because of the splined connection of of sheave 85 to shaft 52, the shaft 52 also rotates in a counterclockwise direction transmitting this rotary drive to a sprocket (not shown) about which is mounted one of the chains of the upper bale forming means 46. The counterclockwise rotation of this sprocket causes the upper bale forming means 46 to reverse its normal direction of travel and impart topspin to the completed crop roll R as it urges the roll R out of the roll forming machine's bale forming region. However, the disengagement of the one way clutch 124 causes the lower bale forming means or apron 89 to normally remain in a position of rest during discharge. Upon completion of the ejection of the completed crop roll R the upper frame or tailgate 20 is lowered, thereby causing the idlers 99 and 91 to be driven generally downwardly and forwardly into the position generally shown in solid lines in FIG. 2. As the idler 91 is lowered it causes the belt 75 to lose contact with the sheave 85 and, therefore, allows the upper bale forming means 46 to cease turning in its reverse direction. As the idler 99 is lowered with the closing of the tailgate or upper frame 20, it comes into contact again with belt 84 and supplies sufficient tension to permit the rotary drive force to be transferred from the continuously turning sheave 74 to sheave 85 via the belt 84 so that the sheave 85 drives the shaft 52 in a clockwise direction. This allows the upper apron or bale forming means 46 to be driven in the direction illustrated in FIG. 1.

However, on rare occasions when, for example, the core of the crop roll may break down or the supply of crop material is exhausted, it becomes necessary for the machine's operator to discharge a substantially less than fully formed crop roll or bale. The automatic reversing of the upper bale forming means 46 is not effective to discharge the incomplete bale because of the relatively small amount of the roll's surface area which the upper bale forming means 46 can frictionally engage. On these occasions the operator pulls the pull line or rope 141, causing the control plate 139 to pivot on pivot arm 107 about pin 117 generally downwardly and forwardly. This prevents the idler 99 from riding upwardly on arm 100, thereby maintaining the tension on belt 84. Thus, the disengaging of the lower bale forming means 89 is avoided while the tailgate 20 is raised to the predetermined height generally indicated by the solid line position shown in FIG. 1. Since the lower bale forming means 89 continues to be driven rearwardly, the partially formed crop roll r is carried out of the bale forming region and out the rear of the roll forming machine 10. The elevating of the tailgate 20 raises the upper bale forming means 46 sufficiently so that it does not contact the partially formed crop roll r even though it continues to be driven in its first driven direction, indicated by the arrow in FIG. 1.

Should the operator attempt to activate the override mechanism by pulling on the pull line 141 after the tailgate 20 has been raised above the predetermined point in its arcuate path of travel, the mechanical advantage and design of the connecting arm 143, angle arm 144, control plate 139, and the drive means 19 prevents the override from being activated. This is effected by the force of the hydraulic cylinders 41 lifting the tailgate 20 and the attached idlers 91 and 99 beyond points in their respective pivotal paths of travel from which the operator can lower them to override the automatic reversing of the upper bale forming means 46. Since the belt 75 is back wrapped about the sheave 85 when the tailgate 20 is elevated above the previously mentioned second predetermined point, any attempts to activate the override mechanism above this second predetermined point in effect would be an attempt to drive the upper bale forming means 46 in two directions at the same time. Thus, the override mechanism is protected from damaging the drive means 19 by its design and the interaction of the tailgate 20 and the drive means 19.

It should be noted at this point that the instant invention is equally well employed on a roll forming machine which either does not utilize the movement of the upper bale forming means or in fact does not use the movement of the upper bale forming means in its original direction of travel to eject a partially or fully formed crop roll from the machine with the lower bale forming means disengaged. The overriding of the disengagement of the lower bale forming means will permit the lower bale forming means to discharge the crop roll generally regardless of any movement of the upper bale forming means.

While the preferred structure in which the principles of the present invention have been incorporated is shown and described above, it is to be understood that the invention is not to be limited to the particular details thus presented but, in fact, widely different means may be employed in the practice of the broader aspects of this invention. The scope of the appended claims is intended to encompass all obvious changes in the details, materials and arrangements of parts that will occur to one of ordinary skill in the art upon a reading of this disclosure.

Having thus described the invention, what is claimed is:

1. In a crop roll forming machine having a pickup, a tailgate movable in an arcuate path of travel between a first point and a second point, an upper bale forming means reversibly movable in a first direction and an opposing second direction, a lower bale forming means movable in at least a first direction of travel, the upper and lower bale forming means generally defining therebetween a roll forming region, and drive means connectable to the upper and lower bale forming means effective to automatically reverse the movement of the upper bale forming means when the tailgate is elevated beyond a predetermined point in its arcuate path of travel and to stop the travel of the lower bale forming means, the improvement comprising:

selectively actuatable control means cooperative with the drive means such that when activated the movement of the upper bale forming means continues to move in the first direction and the lower bale forming means continues to travel in the first direction to eject a partially formed crop roll from the roll forming region.

2. The roll forming machine according to claim 1 wherein the control means is actuatable only prior to the tailgate being elevated beyond the predetermined point.

3. The roll forming machine according to claim 2 wherein the control means further comprises a plate member pivotally fastened to the machine and connectable to the tailgate, the plate member further having a pulling means fastened thereto for selective manual activation.

4. The roll forming machine according to claim 3 wherein the upper bale forming means further comprises a pair of chains interconnected by parallel spaced apart generally horizontal members forming a generally curvilinear crop engaging surface.

5. The roll forming machine according to claim 1 wherein the upper bale forming means comprises at least one rotatably mounted belt.

6. The roll forming machine according to claim 1 wherein the upper bale forming means comprises a plurality of adjacent generally cylindrical surfaces rotatably mounted to the machine.

7. A roll forming machine for forming cylindrical bales of crop material which comprises:
(a) a generally upright mobile frame having opposing sides with an infeed area and an outlet area therebetween, the frame being adapted to travel across a field of crop material;
(b) pickup means mounted to the frame to gather crop material from the field and deliver it to the infeed area;
(c) a tailgate mounted to the frame and movable in a predetermined path of travel between a first point and a second point;
(d) lifting means mounted to the frame connected to the tailgate to move the tailgate between the first point and the second point;
(e) upper bale forming means supported by the frame and reversibly movable in a first direction and an opposing second direction;
(f) lower bale forming means supported by the frame generally below the upper bale forming means and movable in at least a first direction of travel;
(g) a roll forming region defined generally by the upper bale forming means and the lower bale forming means and positioned between the inlet and outlet areas;
(h) drive means rotatably affixed to the frame and connectable to the upper and lower bale forming means effective to automatically reverse the movement of the upper bale forming means when the tailgate is elevated beyond a predetermined point in its path of travel, the drive means further being effective to stop the travel of the lower bale forming means beyond the predetermined point; and
(i) selectively actuatable control means mounted to the frame and cooperative with the drive means such that when actuated the upper bale forming means continues to move in the first direction and the lower bale forming means continues to travel in its first direction to eject a partially formed crop roll from the roll forming region.

8. The roll forming machine according to claim 7 wherein the control means is actuatable only prior to the tailgate being elevated beyond the predetermined point.

9. The roll forming machine according to claim 8 wherein the control means further comprises a plate member pivotally fastened to the machine and connectable to the tailgate, the plate member further having a pulling means fastened thereto for selective manual activation.

10. The roll forming machine according to claim 7 wherein the tailgate is pivotally mounted to the frame and movable along a generally arcuate path of travel.

11. A roll forming machine for forming cylindrical bales of crop material which comprises:
(a) a generally upright mobile frame having opposing sides with an infeed area and an outlet area therebetween, the frame being adapted to travel across a field of crop material;
(b) pickup means mounted to the frame to gather crop material from the field and deliver it to the infeed area;
(c) a tailgate mounted to the frame and movable in a predetermined path of travel between a first point and a second point;
(d) lifting means mounted to the frame connected to the tailgate to move the tailgate between the first point and the second point;
(e) upper bale forming means movably supported by the frame;
(f) lower bale forming means supported by the frame generally below the upper bale forming means and movable in at least a first direction of travel;
(g) a roll forming region defined generally by the upper bale forming means and the lower bale forming means and positioned between the inlet and outlet areas;
(h) drive means rotatably affixed to the frame and connectable to the lower bale forming means effective to automatically disengage the lower bale forming means when the tailgate is elevated beyond a predetermined point in its path of travel; and
(i) selectively actuatable control means mounted to the frame and cooperative with the drive means such that when actuated the lower bale forming means continues to travel in its first direction to eject a crop roll from the roll forming region.

12. The roll forming machine according to claim 11 wherein the control means is actuatable only prior to the tailgate being elevated byond the predetermined point.

13. The roll forming machine according to claim 12 wherein the control means further comprises a plate member pivotally fastened to the machine and connectable to the tailgate, the plate member further having a pulling means fastened thereto for selected manual activation.

14. The roll forming machine according to claim 11 wherein the tailgate is pivotally mounted to the frame and movable along a generally arcuate path of travel.

* * * * *